United States Patent [19]
Knight et al.

[11] Patent Number: 5,782,070
[45] Date of Patent: Jul. 21, 1998

[54] METHOD AND APPARATUS FOR PADDING AND CUSHIONING AN EQUINE SADDLE

[75] Inventors: Ralphine S. Knight; Joel D. Knight, both of Ft. White; Kathryn J. Bridges, Alachua, all of Fla.

[73] Assignee: Fastrac Ideas, Inc., High Springs, Fla.

[21] Appl. No.: 516,488

[22] Filed: Aug. 17, 1995

[51] Int. Cl.$^6$ .................. B68C 1/08; B68G 5/02
[52] U.S. Cl. .................. 54/66; 54/65; 54/44.5
[58] Field of Search .................. 54/65, 66, 44.5, 54/44.6, 44.7

[56] References Cited

U.S. PATENT DOCUMENTS

| | | |
|---|---|---|
| 532,419 | 1/1895 | Haines, Jr. . |
| 539,207 | 5/1895 | Wall . |
| 604,567 | 5/1898 | McClain .................. 54/65 |
| 673,331 | 4/1901 | Bouchat .................. 54/65 |
| 753,751 | 3/1904 | Stem . |
| 770,975 | 9/1904 | Lohr . |
| 3,343,338 | 9/1967 | Stubben . |
| 3,466,852 | 9/1969 | Stoner .................. 54/65 |
| 3,911,648 | 10/1975 | Lightfoot .................. 54/44.5 |
| 4,033,097 | 7/1977 | Petit .................. 54/44.6 |
| 4,136,506 | 1/1979 | Miller .................. 54/66 |
| 4,350,726 | 9/1982 | Berry, Jr. .................. 428/95 |
| 4,461,099 | 7/1984 | Bailly .................. 36/44 |
| 4,695,496 | 9/1987 | Lee .................. 54/65 X |
| 4,885,811 | 12/1989 | Hayes .................. 5/81.1 T |
| 5,175,986 | 1/1993 | Farley .................. 54/66 X |
| 5,259,080 | 11/1993 | Blaha .................. 5/740 |

FOREIGN PATENT DOCUMENTS

2667584-A1  4/1992  France .................. 54/65

*Primary Examiner*—Gene Mancene
*Assistant Examiner*—Yvonne R. Abbott
*Attorney, Agent, or Firm*—Baker & Botts, L.L.P.

[57] ABSTRACT

A method and apparatus is disclosed for padding and cushioning an equine saddle for use between the saddle and the equine's back. The apparatus consists of a pad that includes an inner layer resistant to moisture and an outer layer for contacting the equine's back and the underside of the saddle. The pad includes a pocket for receiving an inflatable/deflatable cushion that enhances the animal's comfort.

11 Claims, 2 Drawing Sheets

METHOD AND APPARATUS FOR PADDING AND CUSHIONING AN EQUINE SADDLE

TECHNICAL FIELD OF THE INVENTION

This invention relates generally to the field of saddles for equines, such as horses, and more specifically to a method and apparatus for cushioning a horse saddle.

BACKGROUND OF THE INVENTION

Horses are generally ridden with saddles, which are essentially a leather seat for the rider built around a rigid support and secured to the animal's back by a girth or a strap. The rigid support or tree is often times constructed of wood, metal or similarly rigid material making most saddles generally inflexible. After prolonged use, a saddle placed directly on the horse's back will tend to rub and chafe the horse, creating discomfort and potential injury to the animal. In addition, due to exercise and the lack of air contacting the horse's back under the saddle, the horse will sweat profusely. The horse's sweat, together with normal dirt and grime, will tend to degrade and deteriorate the saddle as well as possibly injure the horse.

It has long been known to place a pad between the horse's back and the saddle to provide cushioning and comfort for the horse and protect the saddle from sweat and grime. Originally, the pad was nothing more than a blanket and to this day, saddle blankets are commonly used by many riders. Disadvantages of blankets are that they provide little cushioning to the horse and will tend to compress, absorb moisture and provide little or no protection to the saddle.

Prior approaches to solving the problem of providing a saddle pad to cushion the saddle have generally taken the direction of providing an air-filled bladder or cushion between the saddle and the animal's back. One approach shown in U.S. Pat. No. 770,975 describes a saddle incorporating an air cushion that replaces a conventional saddle pad. Alternative approaches incorporate an air cushion into the saddle directly providing an air-filled pad, and are shown in U.S. Pat. Nos. 753,751 and 532,419. Pads constructed in accordance with these patents all have the disadvantage of placing a rubber material between the horse's back and saddle, which, while it prevents perspiration from contacting the saddle through the rubber bladder, no provision is made for drawing away the perspiration or sweat produced by the horse during the riding exercise.

Therefore, a need has arisen for a method and apparatus for padding and cushioning an equine saddle that overcomes the disadvantages of the prior art, provides greater comfort and cushioning to the horse, provides more air flow under the saddle, and draws moisture and perspiration away from the horse and saddle.

SUMMARY OF THE INVENTION

An apparatus is disclosed for cushioning an equine saddle for use between the saddle and the equine's back. The apparatus consists of a pad that includes an inner layer resistant to the absorption of moisture, an outer layer having a soft, deep pile for contacting an underside of the saddle and for contacting the equine's back, and a foam inner core sandwiched between the first and second outer layers.

A second apparatus is disclosed for cushioning an equine saddle for use between the saddle and the equine's back. The apparatus consists of a pad that includes upper and lower sections, both sections having an inner layer resistant to the absorption of moisture and an outer layer having a soft, deep pile for contacting an underside of the saddle and for contacting the equine's back, and a foam core sandwiched between the inner and outer layers. The upper and lower sections are folded to form a pocket for receiving a cushion.

A third apparatus is disclosed for use with a saddle pad. The apparatus includes a foam inner core having a cell structure that absorbs air from the atmosphere, an outer flexible shell impervious to moisture defining a cavity for surrounding the foam inner core and sealing the foam inner core from the atmosphere, an opening in the flexible shell for transmitting air between the atmosphere and the cavity, and a valve in the opening for controlling air flowing in and out of the cavity.

A method is disclosed for cushioning an equine saddle. The method includes contacting an equine's back and an underside of the equine saddle with a pad having an outer layer constructed of a soft, deep pile; forming an inner layer resistant to the absorption of moisture, and sandwiching a foam inner core between the inner and outer layers.

A second method is disclosed for cushioning an equine saddle. The second method includes forming upper and lower sections, each section having an inner layer resistant to the absorption of moisture,and an outer layer having a soft, deep pile for contacting an underside of the saddle and for contacting the equine's back and attaching the upper section to the lower section to form a pocket for receiving a cushion.

A third method is disclosed for cushioning an equine saddle. The third method includes forming an outer flexible shell impervious to moisture to define a cavity and sealing the cavity from the atmosphere, constructing an opening in the shell for air to pass in and out of the cavity, filling the cavity with a foam inner core having a cell structure that absorbs air from the atmosphere, and controlling the flow of air in and out of the cavity.

A technical advantage of the present invention is that a saddle pad is provided that allows more air to flow under the saddle and draws moisture and perspiration away from the horse and saddle. Another technical advantage of the present invention is that a cushion is provided for use with the saddle pad of the present invention that provides greater comfort and cushioning to the horse.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE INVENTION

The preferred embodiment of the present invention and its advantages are best understood by referring to FIGS. 1 through 6 of the drawings, like numerals being used for like and corresponding parts of the various drawings.

Figure 1:
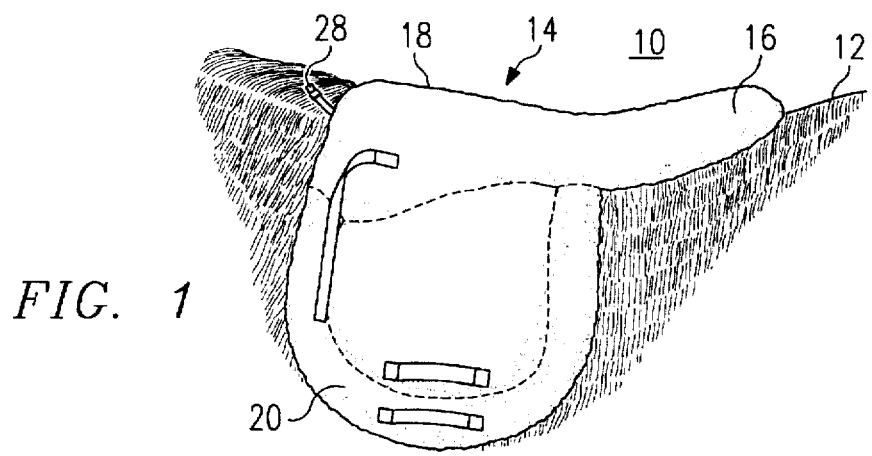
FIG. 1 illustrates a saddle pad and inflatable/deflatable cushion of the invention in use on the back of equine.
Figure 3:
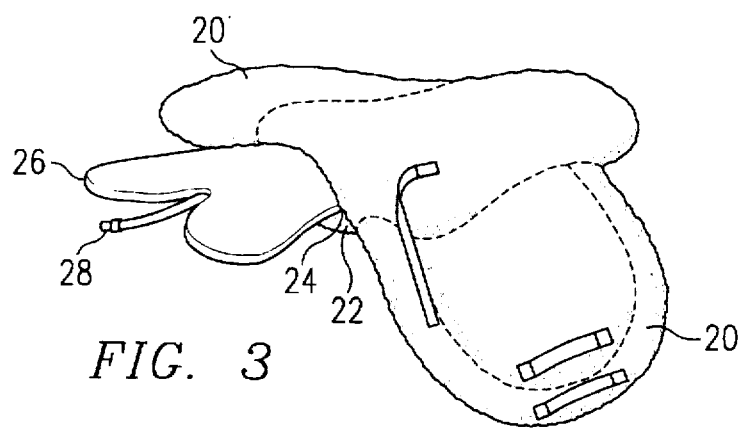
FIG. 3 illustrates a saddle pad of the invention showing a pocket to receive a cushion of the invention.

Referring to FIGS. 1 and 3, the invention is shown generally at 10 positioned on the back of an equine or horse 12. In the preferred embodiment, pad 14 has an outer layer 16, an upper section 18, a lower section 22 and flaps 20. As shown in FIGS. 1 and 3, pad 14 is contoured to conform to the contour or profile of an English saddle. In other embodiments, pad 14 can be contoured to fit the profile of different types of saddles such as dressage, eventing and western. Upper section 18 together with lower section 22 form a pocket 24 (FIG. 3) for receiving inflatable/deflatable cushion 26. In FIG. 1, inflatable/deflatable cushion 26 is contained within pocket 24 and is obscured from view. As we explain in more detail later, inflatable/deflatable cushion 26 includes valve 28 for controlling airflow in and out of cushion 26.

Pad 14, while shown in the preferred embodiment with pocket 24 for receiving cushion 26, can also be constructed in an alternative embodiment without pocket 24. In the preferred embodiment, pad 14 is constructed of a tri-laminate material shown in FIG. 2. Outer layer 16 is formed of a soft, deep pile material which when compressed with the weight of the saddle will still provide airflow between the saddle and the pad 14. Some examples of suitable materials are lambs wool, acrylics, polyesters or a blend. Other suitable materials may be used so long as the material provides a soft, deep pile.

Figure 2:
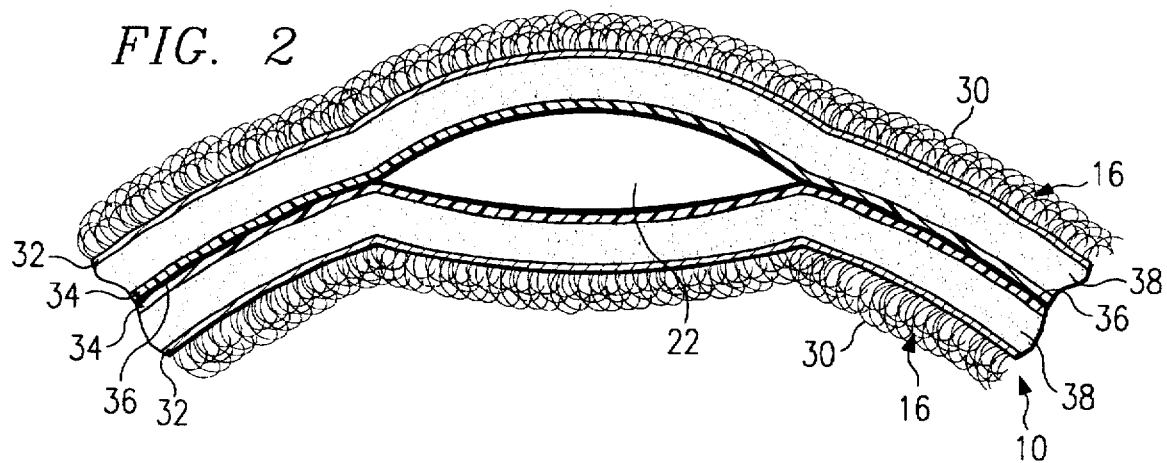
FIG. 2 is a cross section of the material used to construct the saddle pad illustrated in FIG. 1.

In the preferred embodiment, outer layer 16 is constructed of 100% polyester fibers with a polypropylene backing 32. The height of the individual piles 30 are approximately 9/32 of an inch to a full inch. The material weight is approximately thirty-four (34) ounces per linear yard. As shown in FIG. 2, the individual -piles 30 are attached to backing 32 to form outer layer 16. Inner layer 34 can be constructed of any material that provides water resistance or a moisture barrier. In the preferred embodiment, inner layer 34 is a nylon material with a water/moisture resistant polyurethane coating 36. Sandwiched between inner layer 34 and outer layer 16 is an approximately ¼" foam core 38 constructed of an open cell foam such as a low density urethane foam material.

Outer layer 16, foam core 38 and inner layer 34 are laminated together using any conventional method such as gluing or heating. In the preferred embodiment, the lamination process is achieved using an open flame lamination, performed by melting foam core 38 and bonding it to backing 32 and inner layer 34. This tri-laminate material provides significant moisture resistance to protect the saddle while allowing air to flow beneath the saddle and moisture to flow away from the saddle both protecting the saddle and keeping the horse cool. As shown in FIG. 2, the moisture resistant liner 36 prevents the sweat of the horse from coming through to the saddle, thus protecting the saddle from wetness and helping and preserving the saddle for longer life. The piles 30 of outer layer 16 allow air to circulate through the material, thus drawing heat away from the horse.

Figure 4:
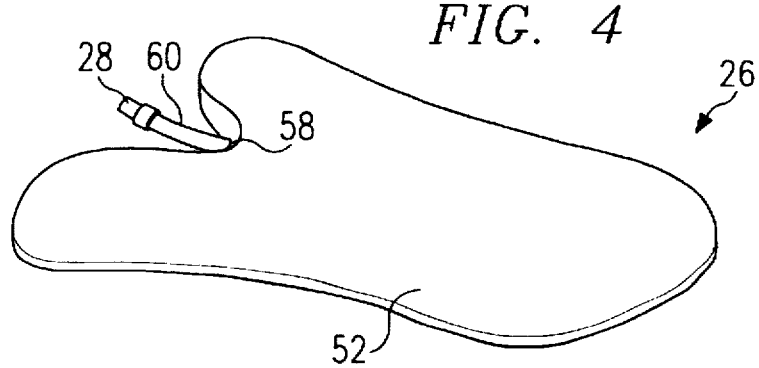
FIG. 4 is a top view of an inflated cushion for use in practicing the invention.
Figure 5:
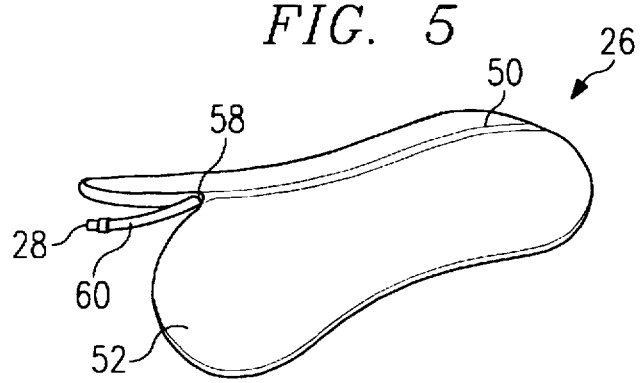
FIG. 5 is a top view of a deflated cushion for use in practicing the invention.
Figure 6:
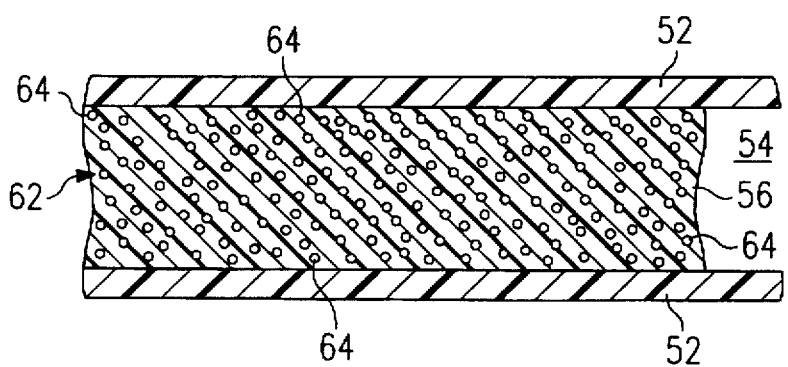
FIG. 6 is a cross-section of the cushion illustrated in FIGS. 4 and 5.

Now referring to FIGS. 4 and 5, an apparatus for use with the saddle pad of FIGS. 1 and 3 is shown generally at 26. The apparatus comprises an inflatable/deflatable cushion 26 having outer shell 52 constructed of any suitable material that is gas and water impermeable. In the preferred embodiment, shell 52 is vinyl-coated nylon. Referring to FIG. 6, showing a cross-section of FIGS. 4 and 5, vinyl-coated nylon shell 52 creates a cavity 54 in which foam core material 56 is placed. In the preferred embodiment, shell 52 is formed from a single piece of vinyl coated nylon that is RF welded to create a pad with a single opening 58. Also -in the preferred embodiment, foam core 56 is constructed of a poly-ether based polyurethane foam such as XL45, XL65 or XL90 supplied by Foamtech Corporation of Fitchburg, Mass. Inserted into opening 58 is tube 60 having valve 28 for controlling airflow in and out of opening 58 into cavity 54. Alternatively, tube 60 can be attached at an opening (not shown) in the center 50 of cushion 26. Tube 60 is attached at such an opening with, by example, an elbow type connector (not shown). In operation, the foam core 56 has a cell structure 62, consisting of individual cells 64, that expand in the presence of normal atmospheric pressure. When valve 28 is opened, air will flow into cavity 54 filling cells 64 and expanding cushion 26. In the preferred embodiment, valve 28 is twist valve with a locking mechanism such as 320-TET from Helkey-Roberts Corporation of St. Petersburg, Fla. Other suitable valves may be substituted.

In operation, cushion 26 is inserted into pocket 24 of pad 14 and placed on the back of horse 12. Valve 28 is placed in the open position. The saddle (not shown) is then placed atop saddle pad 14 with cushion 26 inserted in pocket 24. The weight of the saddle together with the tightening of the girth (not shown) and/or the weight of the rider, forces air to flow from the cells 64 of foam material 56 through valve 28 of cushion 26. This causes cushion 26 and pad 14 to conform both to the shape of the horse's back and the saddle itself. Once cushion 26 and pad 14 have reached the proper shape, valve 28 is locked in the closed position and no further air may escape from foam material 56 nor may air enter foam material 56. Thus, in operation according to the method and apparatus of the present invention, pad 16 and cushion 26 form a therapeutic pad and cushion apparatus which is custom molded to the back of the horse and the saddle.

While the invention has been particularly shown and described by the foregoing detailed description, it will be understood by those skilled in the art that various other changes in form and detail may be made without departing from the spirit and scope of the invention.

What is claimed is:

1. An apparatus for padding and cushioning an equine saddle for use between the saddle and the equine's back, the apparatus comprising:

(a) a cushion having a foam inner core with a cell structure that absorbs air from the atmosphere, a gas impermeable outer flexible shell impervious to moisture defining a cavity for surrounding the foam inner core and sealing the foam inner core from the atmosphere, an opening in the flexible shell for transmitting air between the atmosphere and the cavity, a valve in the opening for controlling air flowing in and out of the cavity; and (b) a pad having lower and upper sections, both sections having an inner layer resistant to the absorption of moisture, an outer layer having a soft, deep pile for contacting an underside of the saddle and for contacting the equine's back, and a foam inner core sandwiched between the inner and outer layers, a pocket formed by the upper and lower sections for receiving the cushion.

2. An apparatus in accordance with claim 1, further comprising a contoured shape conforming to a contour of the saddle.

3. An apparatus in accordance with claim 1, wherein the inner layer is constructed of polyurethane coated nylon.

4. An apparatus in accordance with claim 1, wherein the outer layer is constructed of polyester fibers.

5. An apparatus in accordance with claim 1, wherein the flexible shell is constructed of vinyl-coated nylon.

6. An apparatus in accordance with claim 1, wherein the foam inner core is constructed of poly-ether based polyurethane.

7. A method for padding and cushioning an equine saddle on an equine's back, the method comprising:
   (a) placing upon the back of an equine a pad having lower and upper sections, both sections having an inner layer resistant to the absorption of moisture, an outer layer having a soft, deep pile for contacting an underside of the saddle and for contacting the equine's back, and a foam inner core sandwiched between the inner and outer layers, a pocket formed by the upper and lower sections;
   (b) inserting a cushion into the pocket of the pad, the cushion having a foam inner core with a cell structure that absorbs air from the atmosphere, a gas impermeable outer flexible shell impervious to moisture defining a cavity for surrounding the foam inner core and sealing the foam inner core from the atmosphere, an opening in the flexible shell for transmitting air between the atmosphere and the cavity, a valve in the opening for controlling air flowing in and out of the cavity;
   (c) placing the saddle upon the cushion filled pad positioned on the equines back;
   (d) opening the valve to allow air to escape from the foam inner core of the cushion so that the pad and cushion conform to the saddle and the equine's back; and
   (e) closing the valve to prevent any more air to escape from the foam inner core of the cushion.

8. A method in accordance with claim 7 further comprising constructing the inner layer resistant to the absorption of moisture from polyurethane coated nylon.

9. A method in accordance with claim 7 further comprising constructing the outer layer having a soft, deep pile of polyester fibers.

10. A method in accordance with claim 7 further comprising constructing the gas impermeable outer flexible shell of vinyl-coated nylon.

11. A method in accordance with claim 7 further comprising constructing the foam inner core of the pad and the cushion poly-ether based polyurethane.

* * * * *